Patented Feb. 2, 1954

2,668,116

UNITED STATES PATENT OFFICE 2,668,116

METHOD OF CONTROLLING STEM-END DECAY AND MOLD ON CITRUS FRUITS

Paul A. Wolf, Midland, Mich., assignor to The Dow Chemical Company, Midland, Mich., a corporation of Delaware No Drawing. Application August 5, 1952, Serial No. 302,830

7 Claims. (Cl. 99—154)

The present invention relates to a method for the treatment of citrus fruits to protect and immunize the fruit against the growth of the organisms of mold and stem-end decay.

Citrus fruits, after harvesting, are particularly susceptible to attack by organisms of mold and decay during transit and storage. Representative of these organisms are Penicillium digitatum and Penicillium italicum, the causative agents of blue and green mold on citrus, and Diplodia natalensis and Phomopsis citri, which attack the fruit through the button or stem-end to bring about a condition known as stem-end rot or decay. The destructive effects of such fungal organisms are noted in a substantial portion of each crop shipped to market.

Many materials have been proposed and used with varying success for the suppression of mold, rot and decay of citrus. Although some fungicides are very active in controlling blue and green molds, their use has been necessarily limited due to their inability to protect the fruit against stem-end decay. Such failure has been attributed to poor penetration and wetting of the button and stem-end area of the fruit, thereby failing to gain access to and accomplish the control of the organisms located in that area. Other materials have been unsatisfactory due to cost, odor, human toxicity, and tendencies to impart an unpalatable taste to the fruit. A particular disadvantage of other treating materials has been their tendency to burn or injure the fruit, or to extract the natural waxes and oils from the delicate skin so that the latter becomes dulled, spotted or withered. With other toxic compositions, a further disadvantage has been high vapor pressures whereby residues thereof quickly volatilize from the fruit surface leaving the latter vulnerable to reinfestation from airborne spores. The need for an inexpensive and effective method for the treating of citrus fruit to protect and immunize the fruit against organisms of mold and stem-end decay is well recognized, as these diseases constitute one of the major problems confronting the citrus industry.

It is an object of the present invention to provide a method for treating citrus fruits whereby the fruit may be protected after harvesting against the growth of the organisms of mold and stem-end decay. A further object is to provide a method for retarding the growth of fungal organisms on whole citrus fruit which does not burn or injure the skin of the fruit, or extract therefrom the natural waxes and oils. Another object is the provision of a method which does not impart an offensive odor or unpalatable taste to the fruit or other foods stored therewith. Still another object is the provision of such a method employing an active agent which is not toxic to humans. Still other objects will become apparent from the following specification and claims.

According to the present invention it has been discovered that certain oximes may be used in the treatment of citrus fruit for the purpose of protecting the fruit from mold and decay caused by fungal organisms, without burning, withering or otherwise injuring the fruit. More particularly, it has been discovered that citrus fruit may be immunized or protected against the attack of mold and stem-end decay organisms, by treatment with a composition comprising from about 1 to 3 percent by weight of an oxime in an aqueous alkaline medium, the oxime being characterized by the formula

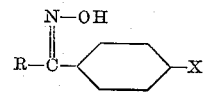

wherein R is hydrogen, methyl or ethyl and X is methoxy or allyloxy. This treatment not only kills the molds and spores originally present on the fruit, but, in addition, the fruit is protected from subsequent reinoculation over the normal marketing period.

The oximes as previously defined have been found soluble in the amount up to about 3 percent by weight in an aqueous alkaline medium such as aqueous sodium or potassium hydroxide. In general, satisfactory solutions are obtained when an alkaline agent is employed in an amount sufficient that the pH of the treating medium is at least 11. In practice, an aqueous mixture containing the oxime is neutralized with the alkaline agent and thereafter enough of the alkaline agent and water is added to the aqueous mixture to bring the pH to at least 11 and to produce a solution containing from 1 to 3 percent of the oxime.

In carrying out the present method, the fruit may be contacted with the treating composition in any convenient manner such as by spraying or dipping. With any contacting procedure, it is important that the entire surface of the fruit be thoroughly wet with the fungicidal mixture. Following the application, the wetted surfaces are dried by evaporation and the fruit thereafter waxed, polished or otherwise handled as may be desired.

The treating operation may be carried out at any convenient temperature and preferably within the range of from 60° to 100° F. In a preferred method of operation, the fruit is immersed in the treating composition at a temperature of from 60° to 100° F. for a period of time sufficient to insure complete wetting of the entire surface. The contacting time between the solution and the fruit need not exceed from 1 to 3 minutes, although periods up to 5 minutes may be employed. These periods are sufficient to insure adequate penetration of the button of the fruit and the rough and irregular surfaces adjacent thereto.

If desired, a wetting and emulsifying agent may be incorporated in the treating composition to aid in the rapid and complete wetting of the fruit surfaces. Suitable wetting agents include those of the non-ionic and anionic types such as the condensation products of alkylene oxides with phenols and organic acids, complex ether alcohols, mahogany soaps and the like. Treating solutions may contain from 0.1 to 12 percent by weight of such wetting agents.

A preferred embodiment of the present invention is the employment of a wax emulsion as the aqueous alkaline carrier. Treatments with such a carrier medium are adapted not only to control the growth of mold and decay organisms but also to deposit an attractive glossy film upon the fruit surface. Such emulsion compositions may be prepared by adding a molten wax, such as paraffin, carnauba or a mixture thereof, to an aqueous alkaline dispersion of one of the aforementioned emulsifying agents. The addition is carried out with stirring and at a temperature above that of the melting point of the wax. According to conventional practices, satisfactory aqueous wax emulsions may be prepared by employing from about 2 to 10 percent by weight of wax and a suitable emulsifying and dispersing agent in the aqueous alkaline medium. The fungicidal oxime may be incorporated and dissolved in amount up to 3 percent by weight of the aqueous alkaline phase of such carriers to prepare the ultimate treating compositions.

In an operation representative of the present method, tree-ripened oranges are thoroughly washed and thereafter dipped for about 0.5 minute in an aqueous alkaline solution of from 1 to 3 percent by weight of the oxime. The treating solution is maintained at a minimum pH of 11. The contacting of the fruit with the treating solution is carried out at a temperature of from 60° to 100° F. Following the dipping operation, the surfaces of the fruit are allowed to evaporate to dryness and the fruit thereafter waxed, polished and packaged for shipment to market.

The following examples illustrate the invention but are not to be contrued as limiting the same.

*Example 1*

A number of ripe oranges were subjected to scarification to permit of the easy establishment of fungal organisms. The exterior surface of each orange was thereafter thoroughly inoculated with an aqueous dispersion of the spores and mycelia of a mixed culture of citrus mold and decay organisms including *Phomopsis citri* and *Pencillium digitatum*. The inoculated oranges were left overnight at room temperature to establish fungal growth. Following the latter period, a portion of the fruit was dipped, at room temperature, for about one minute in a solution of 2 percent by weight of p-methoxyacetophenone oxime in dilute aqueous sodium hydroxide. This solution had a pH of about 12.8. Following the application of the treating solution, the oranges were allowed to stand at room temperature until residues of the treating solution were dried. The dipped oranges and untreated but scarified and inoculated control fruit were then incubated at room temperature and observed from time to time to determine the presence or absence of organism growth. After 12 days, the treated fruit was found to be free of mold and decay while the checks are heavily overgrown with the fungal complex. The treated fruit exhibited no substantial injury attributable to the oxime composition.

*Example 2*

In like manner, other oranges were scarified, inoculated, incubated and thereafter dipped at room temperature and for about one minute in a solution of 3 percent by weight of p-methoxyacetophenone oxime in dilute aqueous sodium hydroxide. The treating solution had a pH of about 13.

Following drying and storage for 10 days, at room temperature, the fruit was examined and a 100 percent control of fungal growth observed without evidence of substantial injury of the fruit from the treating solution. In contrast, the checks were found to be heavily overgrown with the complex of fungal organisms.

*Example 3*

In a similar manner, oranges were prepared, inoculated, incubated and dipped at room temperature and for about one minute in a solution of 1 percent by weight of p-allyloxybenzaldehyde oxime in dilute aqueous sodium hydroxide. The pH of this composition was about 12.5.

After storage for 12 days at room temperature, the fruit was found to be free of fungal growth. In contrast, 100 percent of the checks were found to be heavily overgrown with the fungal complex. The treated fruit showed no evidence of injury attributable to the treating solution.

*Example 4*

Para-methoxybenzaldehyde oxime was similarly employed for the control of blue and green mold and stem-end decay on oranges. The scarified and inoculated fruit was dipped at room temperature for about ½ of a minute in a solution of 2 percent by weight of the oxime in dilute aqueous sodium hydroxide. The pH of this composition was about 12. Part of the inoculated oranges were maintained as checks.

After storage for 13 days at room temperature, the fruit was examined and a 100 percent control of fungal growth observed without evidence of injury to the fruit from the treating solution. In contrast, the checks were found to be heavily overgrown with the complex of fungal organisms.

*Example 5*

In a similar manner, scarified and inoculated oranges are dipped at room temperature for about 3 minutes in a solution of 2 percent by weight of p-allyloxyacetophenone oxime in dilute aqueous potassium hydroxide. The pH of this composition is about 12.

After storage for 2 weeks at room temperature, the fruit is found to be free of fungal growth and injury due to the oxime solution. In contrast, the checks are heavily overgrown with the fungal complex.

*Example 6*

Ripe oranges were prepared, inoculated and dipped at room temperature for about one minute in a solution of 2 percent by weight of p-methoxypropiophenone oxime in dilute aqueous sodium hydroxide. The pH of this composition was about 12.7.

After storage for one week at room temperature, the fruit was found to be free of fungal growth and injury due to the treating solution. In contrast, the checks were heavily overgrown with the fungal complex.

Example 7

In like manner, other oranges were scarified, inoculated, incubated and thereafter dipped at room temperature for about one minute in a solution of 3 percent by weight of p-methoxypropiophenone oxime in dilute aqueous sodium hydroxide. The treating solution had a pH of about 12.9.

Following drying and storage for one week the fruit was examined and a 100 percent control of fungal growth observed without evidence of injury from the treating solution. In contrast, the checks were found to be heavily overgrown with the fungal complex.

Example 8

Scarified and inoculated oranges are dipped at room temperature for about two minutes in a solution of 2 percent by weight of p-methoxyacetophenone oxime in dilute aqueous potassium hydroxide. The pH of this composition is 11.

After storage for 15 days at room temperature, the fruit is found to be free of fungal growth and injury due to the treating solution. The untreated but scarified and inoculated check fruit are found to be heavily overgrown with the complex of fungal organisms.

Example 9

A solution of p-methoxyacetophenone oxime in dilute aqueous sodium hydroxide is admixed with an aqueous wax emulsion to prepare an emulsion treating composition containing about 6 percent by weight of carnauba wax, 1 percent of paraffin wax and 5 percent of an alkylated aryl polyether alcohol (Triton X-100). The continuous phase of the latter treating composition has a pH of about 12 and contains 2 percent by weight of the oxime. Ripe oranges are dipped in the above oxime composition and thereafter stored at room temperature. Other oranges are set aside as checks.

After storage for 14 days, the treated fruit is found to be substantially free of fungal growth while many of the check oranges show evidence of mold and decay. The treated fruit exhibit no substantial injury attributable to the oxime composition.

Example 10

Ripe oranges are thoroughly washed with water and transferred while wet to a room maintained at about 85° F. and 90° relative humidity. Here the oranges are subjected to ethylene gas for about 2 days to accelerate the development of stem-end decay. Thereafter, the stem-ends of the fruit are wetted with a solution of 2 percent by weight of p-methoxyacetophenone oxime in dilute aqueous sodium hydroxide. The pH of this solution is about 12. The treated fruit and fruit which was gassed, but not dipped, are then incubated at 70° F. and examined at intervals for evidence of stem-end decay and injury due to the treating solution. After storage for two weeks, the treated fruit is found to be substantially free of stem-end decay and injury attributable to the treating solution. Evidence of stem-end rot is found on many of the check oranges.

The oxime type compounds as employed in accordance with the present invention may be produced by known methods disclosed in "Organic Preparations," Weygand, C., Interscience Publishers (1945), p. 264–70; "The Chemistry of Organic Compounds," Conant and Blatt, the MacMillan Company (1947), p. 144; Beilstein, vol. 8, p. 103, first supplement, p. 536, second supplement, p. 69; and Chem. Abstracts, 36, p. 4506 (7) (1942).

I claim:

1. A method of treating whole citrus fruit without substantial injury thereto, to protect the fruit against attack by mold and stem-end decay organisms, which comprises wetting the fruit with a composition comprising from about 1 to 3 percent by weight of an oxime in an aqueous alkaline medium, the oxime being characterized by the formula

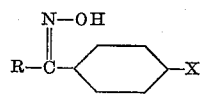

wherein R represents a member of the group consisting of hydrogen, methyl and ethyl and X represents a member of the group consisting of methoxy and allyloxy.

2. A method of treating whole citrus fruit without substantial injury thereto, to protect the fruit against attack by mold and stem-end decay organisms, which comprises wetting the fruit with an aqueous emulsion, the disperse phase of which comprises a wax and the continuous phase of which is at a pH of at least 11 and contains dissolved therein from about 1 to 3 percent by weight of an oxime having the formula

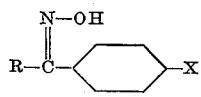

wherein R represents a member of the group consisting of hydrogen, methyl and ethyl and X represents a member of the group consisting of methoxy and allyloxy.

3. A method of treating whole citrus fruit without substantial injury thereto, to protect the fruit against attack by mold and stem-end decay organisms, which comprises wetting the fruit with dilute aqueous sodium hydroxide having dissolved therein from about 1 to 3 percent by weight of an oxime characterized by the formula

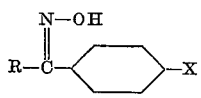

wherein R represents a member of the group consisting of hydrogen, methyl and ethyl and X represents a member of the group consisting of methoxy and allyloxy.

4. A method of treating whole citrus fruit without substantial injury thereto, to protect the fruit against attack by mold and stem-end decay organisms, which comprises wetting the fruit with a composition comprising a dispersion of from 1 to 3 percent by weight of p-methoxyacetophenone oxime in aqueous sodium hydroxide, the composition having a pH of at least 11.

5. A method of treating whole citrus fruit without substantial injury thereto, to protect the fruit against attack by mold and stem-end decay organisms, which comprises wetting the fruit with a composition comprising a dispersion of from 1 to 3 percent by weight of p-methoxybenzaldehyde oxime in aqueous sodium hydroxide, the composition having a pH of at least 11.

6. A method of treating whole citrus fruit without substantial injury thereto, to protect the fruit against attack by mold and stem-end decay organisms, which comprises wetting the fruit with a composition comprising a dispersion of from 1 to 3 percent by weight of p-allyloxybenzaldehyde oxime in aqueous sodium hydroxide, the composition having a pH of at least 11.

7. A method of treating whole citrus fruit without substantial injury thereto, to protect the fruit against attack by mold and stem-end decay organisms, which comprises wetting the fruit with a composition comprising a dispersion of from 1 to 3 percent by weight of p-methoxypropiophenone oxime in aqueous sodium hydroxide, the composition having a pH of at least 11.

PAUL A. WOLF.

References Cited in the file of this patent

UNITED STATES PATENTS

| Number | Name | Date |
|---|---|---|
| 1,816,441 | Peet | July 28, 1931 |
| 2,338,791 | Weedon | Jan. 11, 1944 |